US 6,501,884 B1

(12) United States Patent
Golowich et al.

(10) Patent No.: US 6,501,884 B1
(45) Date of Patent: Dec. 31, 2002

(54) ARTICLE COMPRISING MEANS FOR MODE-SELECTIVE LAUNCH INTO A MULTIMODE OPTICAL FIBER, AND METHOD FOR A MODE-SELECTIVE LAUNCH

(75) Inventors: Steven Eugene Golowich, New Providence, NJ (US); William Alfred Reed, Summit, NJ (US)

(73) Assignee: Lucent Technologies Inc., Murray Hill, NY (US)

( * ) Notice: Subject to any disclaimer, the term of this patent is extended or adjusted under 35 U.S.C. 154(b) by 200 days.

(21) Appl. No.: 09/608,364

(22) Filed: Jun. 30, 2000

(51) Int. Cl.[7] .............................. G02B 6/26; G02B 6/42
(52) U.S. Cl. ............................. 385/38; 385/31; 385/27; 385/28; 385/48; 385/50
(58) Field of Search ............................. 385/38, 31, 27, 385/28, 39, 48, 90, 50, 88

(56) References Cited

U.S. PATENT DOCUMENTS

| | | | | |
|---|---|---|---|---|
| 4,546,249 A | * | 10/1985 | Whitehouse | 250/227 |
| 4,793,679 A | * | 12/1988 | Toda et al. | 350/96.15 |
| 5,949,932 A | * | 9/1999 | Lawrenz-Stolz | 385/33 |

FOREIGN PATENT DOCUMENTS

DE  198 09 823 C1  2/1998  ............ G02B/6/42

OTHER PUBLICATIONS

Haliiday, Resnick, Walker; Fundamentals of Physics 6th Ed. vol. 2; John Wiley and Sons. Inc.; p. 803.*
Raddatz et al., *IEEE Photonics Technology Letters*, "Influence of Restricted Mode Excitation on Bandwidth of Multimode Fiber Links", vol. 10, No., 4, pp. 534–536, Apr. 1998.
Snyder et al., *Chapman & Hall Medical* "Optical Waveguide Theory", Chapter 13, pp. 281–301.

* cited by examiner

*Primary Examiner*—Cassandra Spyrou
*Assistant Examiner*—Leo Boutsikaris

(57) ABSTRACT

Disclosed is a method of launching a light beam from a semiconductor laser into a multimode optical fiber, as well as apparatus for launching the light beam. The light beam is directed at nominally the center of the input face of the multimode fiber such that the (unguided) light beam makes an angle $\theta_b$ (typically in the range 1–20 degrees) with the direction perpendicular to the input face of the multimode fiber. The angle $\theta_b$ is selected such that at least one lower order mode of the guided radiation in the multimode fiber is substantially not excited in the fiber, with at least some higher order modes being substantially excited. Several specific embodiments are disclosed.

7 Claims, 4 Drawing Sheets

ARTICLE COMPRISING MEANS FOR MODE-SELECTIVE LAUNCH INTO A MULTIMODE OPTICAL FIBER, AND METHOD FOR A MODE-SELECTIVE LAUNCH

FIELD OF THE INVENTION

This invention pertains to an article (e.g., a multimode fiber local area network, or means for coupling light into a multimode fiber) that comprises means for mode-selectively launching signal radiation from a semiconductor light source into a multimode fiber (MMF). It also pertains to a method for a mode-selective launch.

BACKGROUND

A MMF is an optical waveguide that supports more than one (typically dozens or even hundreds) guided mode. In an ideal MMF for data transmission, the various modes all have equal group velocities. In practice, however, the common fiber manufacturing processes (e.g., MCVD, OVD) frequently leave perturbations in the refractive index profile of the fiber, typically at or near the center of the core of the fiber. These perturbations tend to adversely affect the group velocities of the low order modes, resulting in decreased bandwidth of the fiber. More specifically, known MMF typically experiences very small coupling of optical power between the various modes. Hence, a pulse of light launched into the lower order modes as well as the high order modes of the MMF will frequently split into two or more separate pulses, which is clearly undesirable for data transmission.

German patent DE 19809823 C1 discloses means for coupling light from a transmitter 1 into a multimode optical fiber 18. The means comprise an adapter fiber 4 (preferably a single mode fiber; see column 2, lines 60–61), which is coupled to the multimode fiber 18 in a plug-type coupler. The input portion of the multimode fiber is positioned axially in ferrule 15, and the output portion of the adapter fiber is positioned in ferrule 8 such that the output portion makes an acute angle α(2–15°) with the axis of ferrule 8. The patent asserts (see column 3, lines 50–57) that the tilted disposition of the adapter fiber in the ferrule results in increased filling of the core of the MMI with guided modes, allegedly resulting in increased bandwidth of the multimode fiber. In any case, the coupling means of the German patent have the disadvantage of relatively high cost, due to the need for the off-axis bore in ferrule 8.

It is known that launching pulses simultaneously into both the low and high order modes should be avoided. See, for instance, L. Raddatz et al., IEEE Photonics Technology Letters, Vol. 10, pages 534–536, (1998). The offset launch method proposed by Raddatz et al. to avoid launching optical power into low-order modes was written into the Gigabit Ethernet standard. In this method, a narrow beam of light is launched perpendicular to the end-face of a MMF, offset a distance from the center of the fiber. Substantially no power is launched into the lower-order modes because the beam does not overlap any of these modes.

Although the above mentioned off-center launch can provide acceptable bandwidth, in practice it has been found to be at best inconvenient to provide the off-center launch. Indeed, manufacturability would be enhanced if the beam could be directed at the center of the end-face of the MMF. This application discloses a technique for mode-selective center launch, and apparatus for such launch.

All herein cited references are incorporated herein by reference.

Glossary and Definitions

By "launch-related members" we mean herein the components of a multi-mode optical fiber system that include the output surface of the signal radiation source and the input face of the multimode fiber, and further includes the optional optical components that are disposed in the light path from the signal radiation source to the input face of the multimode fiber. Associated with each launch-related member is at least one surface that is being traversed by the signal radiation beam from the signal radiation source. The launch-related members typically are disposed such that the direction normal to the output surface of the signal radiation source is not parallel to the direction normal to the input face of the multimode fiber but makes an angle $\theta_b$ therewith.

Herein the modes of a multimode optical fiber are designated in conventional fashion $LP_{ij}$, where i=0, 1, 2, . . . . and j=1, 2, . . . $LP_{01}$ is the fundamental mode. All modes that share a common value of 2j+i also share a common wave number, and are said to constitute a "principal mode group". The quantity 2j+i−1 is called the index of the group. A "lower order mode" herein is a mode belonging to a principal mode group with small index, e.g., 1, 2 or 3.

A light beam is "nominally" directed at the center of a multimode optical fiber if any departure from center incidence is unavoidably due to manufacturing limitations. Such departure will typically be less than about 4 μm. Launch of optical power a given lower order mode is "substantially" avoided if the power in that mode is at most 10% of the power in that mode for $\theta_b$=0.

The "axis" of a semiconductor light source is, in conventional fashion, the direction normal to the output face of the light source in the center of the light beam.

The "axis" of the multimode fiber is, in conventional fashion, the axis of symmetry of a circularly symmetric fiber.

BRIEF DESCRIPTION OF THE DRAWINGS

FIGS. 1–3 and 10 are not intended to be to scale or in proportion.

SUMMARY OF THE INVENTION

The instant invention is embodied in apparatus for launching a light beam from a laser or other semiconductor light source into a multimode optical fiber such that at least some lower order modes of the multimode optical fiber are substantially not excited, with at least some higher order modes being excited.

Significantly, the apparatus comprises one or more launch-related members selected such that said light beam from the semiconductor light source (e.g., a vertical cavity surface emitting laser or VCSEL) is directed onto an input face of the multimode optical fiber nominally at a center of said input face, such that the light beam forms an angle $\theta_b$ with a direction normal to said input face, with $\theta_b$ selected such that at least one of said lower order modes is substantially not excited.

The instant invention is also embodied in a method of launching a light beam from a semiconductor light source into a multimode optical fiber such that at least some lower order modes of the multimode optical fiber are substantially not excited, with at least some higher order modes being excited.

Significantly, the method comprises directing the light beam onto an input face of the multimode fiber, nominally at the center of the input face, such that the light beam forms an angle $\theta_b$ with a direction normal to the input face, with $\theta_b$ selected such that at least one lower order mode is substantially not excited. Preferably several (preferably all) lower order modes are substantially not excited.

DETAILED DESCRIPTION

The shortcoming of the prior art off-center method of coupling signal radiation into a MMF is overcome by the method of the invention, wherein the signal beam impinges nominally centrally on the input face of the MMF, and at least one of the launch-related elements is angled, such that launch of optical power into at least one lower order mode is substantially avoided. Typically the at least one lower order mode includes the $LP_{01}$ fundamental mode. Exemplary of "launch-related" components are the signal radiation source (typically a semiconductor laser), the MMF, the input face of the MMF, and the optional optical components between the output surface of the radiation source and the input face of the MMF.

Figure 1:
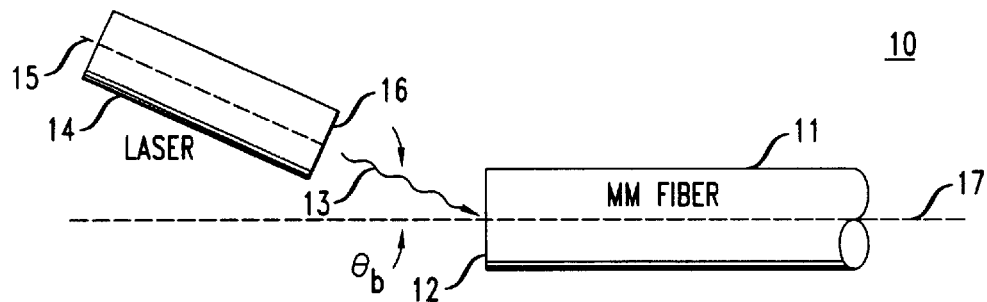
FIGS. 1–3 schematically show exemplary embodiments of apparatus according to the invention.
Figure 2:
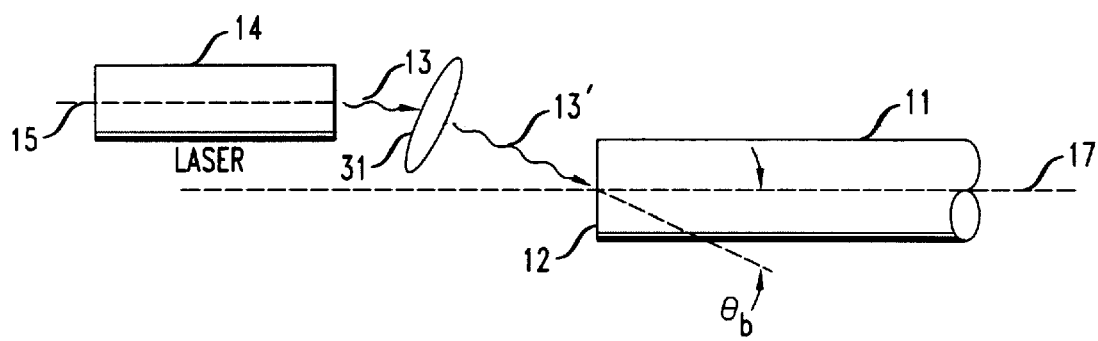
Figure 3:
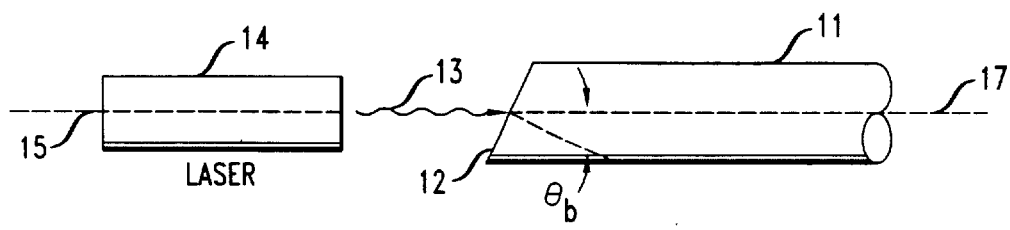
Figure 4:
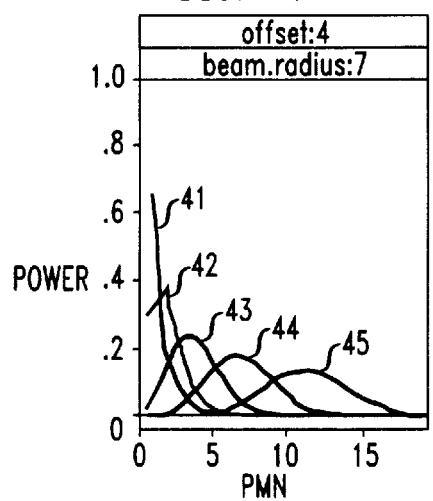
FIGS. 4–9 show optical power as a function of principal mode number, for 0 and 4 μm beam offset, and for various beam radii.
Figure 5:
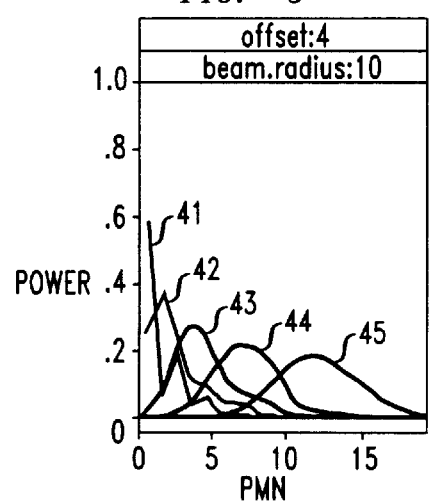
Figure 6:
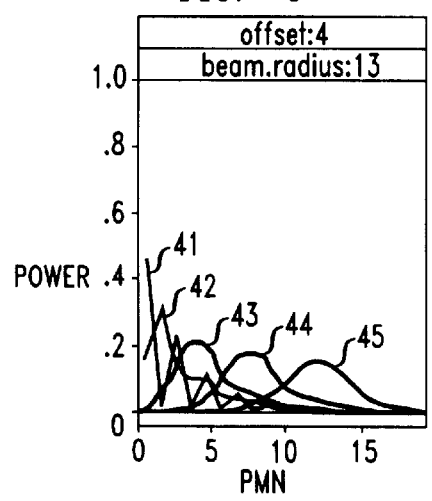
Figure 7:
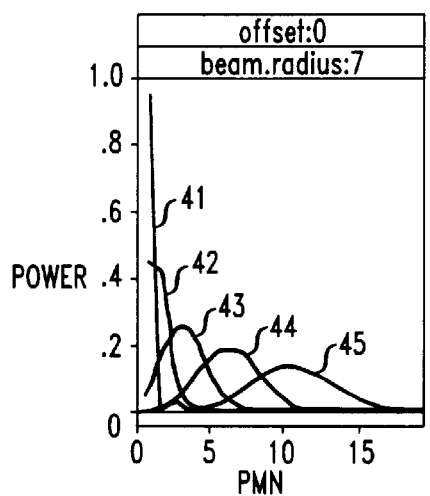
Figure 8:
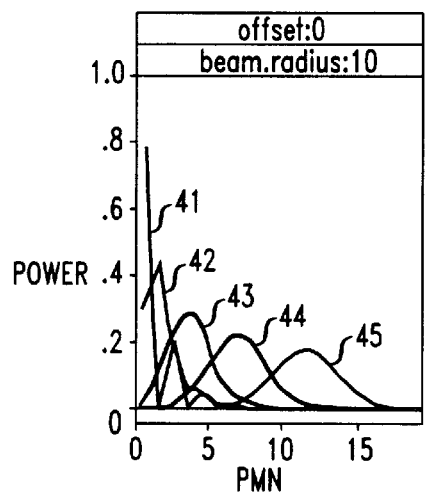
Figure 9:
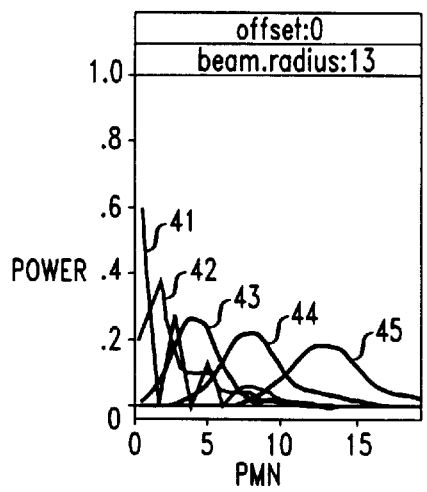

FIGS. 1–3 schematically depict apparatus according to the invention. FIG. 1 shows launch-related components 10 arranged such that the signal radiation beam 13 is tilted by $\theta_b$ with respect to the center axis of the MMF 11. Numeral 12 refers to the input face of the MMF, which in the embodiment of FIG. 1 is at right angle to the axis of the MMF. Numerals 14–16 refer, respectively, to a semiconductor signal radiation source (typically a laser), the center axis of the laser beam, and the output surface of the laser. In the embodiment of FIG. 1, $\theta_b$ is preferably in the range 2–8°.

FIG. 2 shows a further embodiment, wherein an appropriate optical element 31 (e.g., a lens) serves to deviate the signal beam 13 from the axial direction, such that the input face 12 of the MMF is tilted with respect to the signal radiation beam 13. In this embodiment, the angle $\theta_b$ preferably is also in the range 2–8°.

Finally, FIG. 3 shows a still further embodiment, wherein the input face 12 of MMF 11 is tilted with respect to the axis of the MMF. Such a tilted input face can be readily made by cleaving. In the embodiment of FIG. 3, $\theta_b$ preferably is in the range 4–16°. In this embodiment the angle $\theta_b$ is the angle between the axis of the MMF and the direction perpendicular to the input face. In the embodiment of FIG. 2, $\theta_b$ is the angle between the axis of the MMF and the direction of the input beam 13', and in the embodiment of FIG. 1, $\theta_b$ is the angle between the axis of the MMF and the direction of the input beam 13. In the embodiments of FIGS. 1 and 2, the input face of the MMF is essentially perpendicular to the axis of the MMF.

It will be noticed that in the embodiments of FIGS. 1–3 the laser light source 14 is in close proximity, exemplary less than 10 mm, to the input face of the multimode fiber, and the signal radiation beam is unguided from the output face of the semiconductor signal radiation source to the input face of the MMF.

The presence of the angled launch-related component in the signal radiation path serves to substantially avoid launching of signal power into one or more of the low order modes of the MMF. This works best for laser beams with relatively small divergence (e.g., Gaussian beams), with a beam width greater than the spot sizes of the low-order modes of the MMF.

For example, a conventional MMF has a core radius of 50 μm, maximum fractional index difference $(n_{core}-n_{clad})/n_{core}$ of 1%, and a profile shape close to parabolic. For such a fiber, spot size of the fundamental mode is 4 μm. For such a MMF, the launch beam width preferably is greater than 4 μm, and the beam has low divergence (e.g., is a Gaussian beam).

FIGS. 4–9 show the power launched into the various modes of the above-described MMF, under a variety of launch conditions, namely, a Gaussian beam of radius 7, 10 and 13 μm, having offsets of 0 and 4 μm from the center of the fiber, and with angles from 0 to 0.15 radians. The data of FIGS. 5–10 were obtained by calculation using the well known scalar wave approximation to Maxwell's equation. A detailed description of the method can be found, for instance, in A. W. Snyder et al., "Optical Waveguide Theory", Chapman and Hall, London, 1983, chapter 13. The calculations demonstrate that a tilt angle of about 0.075 radians (about 4.3°) is adequate to suppress the low-order modes of the exemplary MMF under the beam radii and beam offsets that were considered. In general, the tilt angle typically is in the range 1°–20°.

Figure 10:
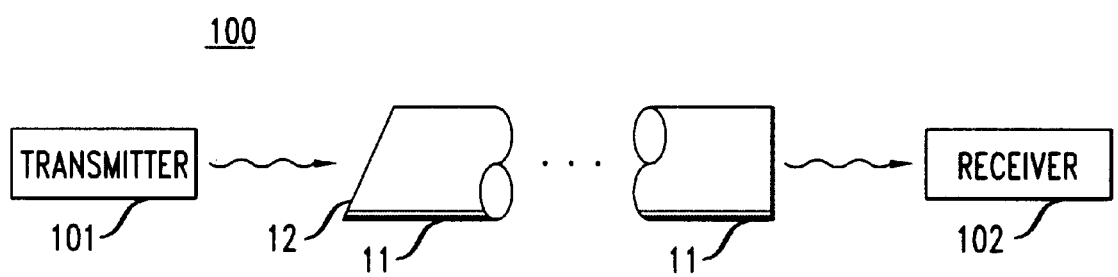
FIG. 10 schematically shows an exemplary multimode fiber communication system according to this invention.

FIG. 10 schematically depicts an optical fiber communication system 100 according to the invention. Numeral 101 refers to a transmitter including a semiconductor signal radiation source (exemplarily a VCSEL), numeral 102 refers to a receiver, and MMF 11 signal-transmissively connects transmitter and receiver. Input face 12 of the MMF is tilted with respect to the direction of the input laser beam, whereby one or more lower order modes in the MMF are substantially not excited.

What is claimed is:
1. A method of launching a light beam from a semiconductor light source into a multimode optical fiber, the multimode fiber having an axis and an input face, the semiconductor light source having an axis and an output face, the light beam being, at least between said output face and said input face, an unguided light beam; wherein the method comprises directing said unguided light beam onto said input face of the multimode fiber nominally at the center of the input face, the unguided light beam being directed such that the light beam at incidence on said input face forms an angle $\theta_b$ with a direction perpendicular to said input face, with $\theta_b$ selected such that at least one lower order mode of a guided radiation being substantially not excited in the multimode fiber, with at least some higher order modes being substantially excited.

2. Method according to claim 1, wherein said semiconductor light source is a semiconductor laser.

3. Method according to claim 2, wherein $\theta_b$ is in the range 1–20 degrees.

4. Method according to claim 3, wherein the axis of the semiconductor laser and the unguided light beam make an angle $\theta_b$ in the range 2–8 degrees with the axis of the multimode fiber.

5. Method according to claim 3, wherein the axis of the semiconductor laser is parallel to the axis of the multimode fiber, with the axis of the semiconductor laser being offset with respect to the axis of the multimode fiber, with at least one optical element disposed between said output face of the semiconductor laser and said input face of the multimode fiber, the at least one optical element selected to direct said unguided light beam from the semiconductor laser to nominally the center of the input face of the multimode fiber such that $\theta^b$ is in the range 2–8 degrees.

6. Method according to claim 3, wherein the input face of the multimode fiber is tilted with respect to the axis of the multimode fiber by $\theta_b$ in the range 4–16 degrees, the axis of the semiconductor laser substantially coinciding with the axis of the multimode fiber.

7. Apparatus for launching a light beam from a semiconductor laser into a multimode optic fiber, the multimode fiber having an axis and an input face, the semiconductor laser having an axis and an output face, with the light beam being, at least between said output face and said input face, an unguided light beam; wherein the apparatus is selected to direct the unguided light from the output face of the semiconductor laser onto the input face of the multimode fiber nominally at the center of the input face, and is further directed such that the light beam at incidence on the input face forms an angle $\theta_b$ with the direction perpendicular to the input face, with $\theta_b$ being in the range 1–20 degrees.

* * * * *